B. J. Moore.
Hay Loader.
Nº 96462      Patented Nov. 2, 1869.
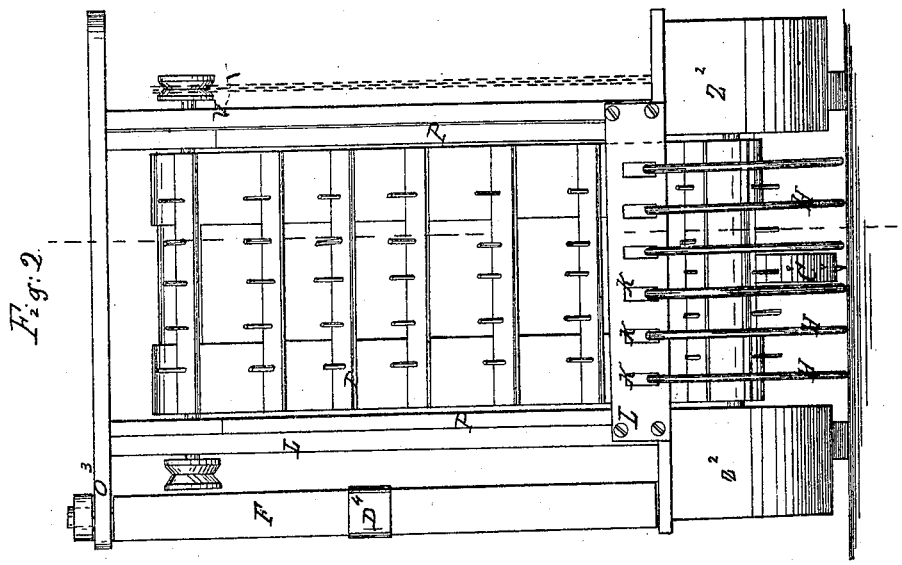
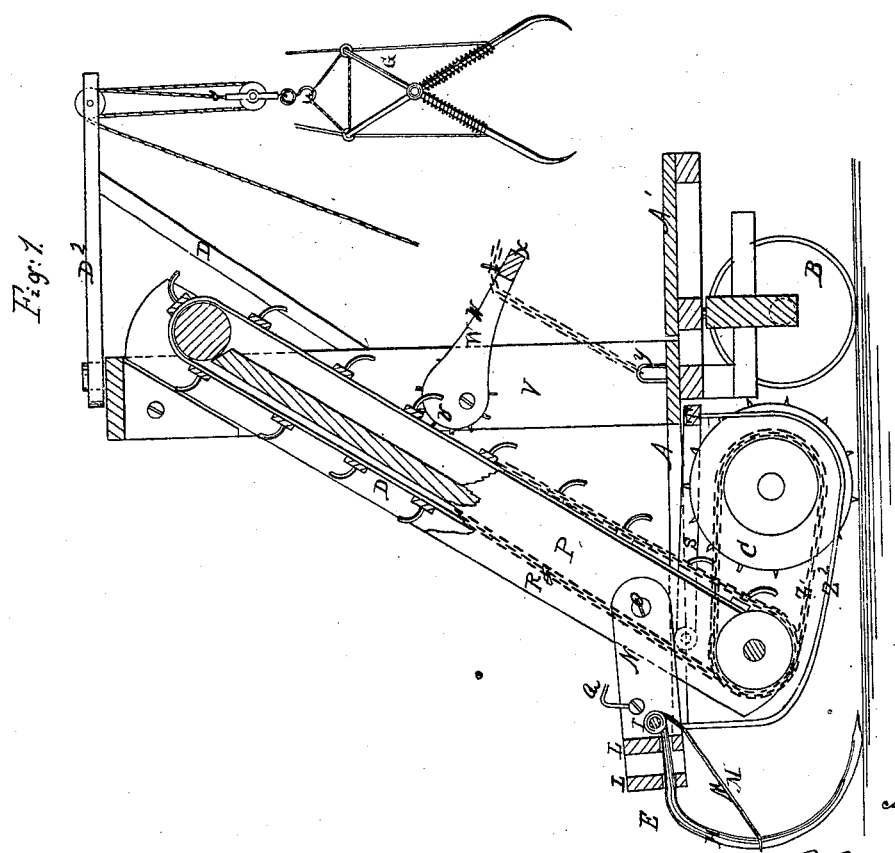

United States Patent Office.

BENJAMIN J. MOORE, OF DRESBACH, MINNESOTA.

Letters Patent No. 96,462, dated November 2, 1869.

---

IMPROVEMENT IN HAY-LOADERS.

---

The Schedule referred to in these Letters Patent and making part of the same.

---

*To all whom it may concern:*

Be it known that I, BENJAMIN J. MOORE, of Dresbach, in the county of Winona, and State of Minnesota, have invented a new and improved Hay-Making, Loading, and Stacking-Machine; and I do hereby declare that the following is a full, clear, and exact description thereof, which will enable others skilled in the art to make and use the same, reference being had to the accompanying drawing, forming part of this specification.

The object of this invention is to provide a simple, cheap, and effective machine, which may be used for spreading hay, or raking, loading, or stacking it; and It consists in an improved arrangement of the truck for supporting and moving the several parts, and imparting the motion to the elevator.

Also, in an arrangement for raising an endless elevator, employed for taking the hay from a rake, and delivering it on a platform, when required to be out of action.

Also, in an improved construction and arrangement of the rake for facilitating the independent action of the teeth and the elevation of the rake above the working position.

Also, in an arrangement of crane and hay-elevating fork, in connection with the endless elevator and platform.

Figure 1 represents a longitudinal sectional elevation of my improved apparatus.

Figure 2 represents a rear elevation of the same.

A represents a platform, or frame, swivelled on the axle of two truck-wheels, B B, and so arranged that a material proportion of the weight is borne on the wheel C, which is employed for driving the endless elevator D.

The said frame A supports, besides the elevator D, a rake, E, and crane F.

On the latter, a hay-elevating fork, G, is suspended, by shears and an operating rope.

The said truck is designed to be provided with a tongue or other means for hitching horses to it, for drawing it over the ground, to gather up the hay by the teeth of the rake E.

The said teeth consist of bent wires H, pivoted to a shaft, I, and work through slots K through the double rake-head L, which permit the oscillation of the said teeth.

They are provided with wire springs M, connected at about the centre of the bow, and to the shaft I in a manner to have a tendency to bear the teeth upon the ground. These springs also prevent the hay from gathering and packing too much under the upper parts of the teeth.

The rake-head is connected by arms N and pivot-joints O to the side rails P of the elevator, and swings thereon, to be elevated and suspended out of contact with the ground when required.

The hooks Q on the rake engage with the staples R on the side rails, to hold the said rake-head up.

The side rails of the elevator are supported at the lower ends on the bars S, projecting from the transverse shaft T, having bearings at each end whereon it is capable of oscillation.

The upper ends are supported upon the toothed wheels U, gearing into teeth or holes in the edges of the said rails, and the said rails are capable of sliding up or down between the vertical posts V, which support the upper works.

The elevator is operated in these movements by the toothed wheels, which have arms W projecting from them, and united by a cross-bar X, for working both wheels simultaneously.

The elevator is held in any required position by chaining the bar X to a staple, Y, in the platform.

The said elevator is operated by chains Z, from pulleys on the shaft of the driving-wheel C.

The hay is gathered by the rake as the machine is moved along the ground, and taken up by the elevators and delivered upon the platform A', where it may be allowed to accumulate in a considerable quantity, to be drawn away to be stacked or cocked; and for taking it from the platform for stacking, I have provided the crane F and elevating-fork G, which takes it therefrom, and raises it to the stack or lowers it upon the ground, for cocking.

In putting the hay into cocks, the fork may be placed on the platform bottom up, with the jaws open to receive the hay as it is delivered from the elevator, and when loaded with a sufficient amount for a cock, it may be raised up by the rope to remove the hay to the ground, where it will deliver it in the proper shape for the cock, the jaws being moved away by hand.

This machine may be employed for spreading hay by elevating the rake, depressing the elevator, removing the platform A', and running it along the swaths or rows, to take up the hay by the rakes of the elevator, and deliver it upon the ground again, through the space occupied by the said platform A'. It may also be employed for carrying the hay in small quantities to the barns or place for stacking.

The brace $D^1$ and the top bar $D^2$ of the crane may be so connected to the vertical part F, that by extending the said vertical part above the upper bearing $D^3$, they may be adjusted up or down thereon, and supported at any point by a pin taking into holes in the post P, under the band $D^4$, by which the brace is connected to the post.

The chains $Z^1$ and chain-pulleys are guarded by broad straps of metal or other substance from the hay, as shown at $Z^2$.

Having thus described my invention,
What I claim as new, and desire to secure by Letters Patent, is—

1. The combination, on the three-wheeled truck, constructed as described, of the elevator D, rake E, crane, and a hay-fork G, substantially as described.

2. The elevator D, suspended on the swinging arms S of the transverse shaft T, and the toothed wheels U, all arranged for adjustment substantially as specified.

3. The rake-teeth pivoted to the shaft I, spring wires M, slotted bars L L, when combined and arranged together and with the swinging supporting arms N, all as specified.

4. The frame A, swivelled on the axle of the wheels B, the driving-wheel C, and detachable platform A', all arranged as specified.

BENJAMIN J. MOORE.

Witnesses:
   JOHN H. O'NEIL,
   LOUIS SAMUEL MOORE.